Feb. 14, 1961 U. S. MITCHELL ET AL 2,971,714

MAGNETIC TAPE REEL WITH DIFFERENTIALLY CONNECTED DOUBLE HUB

Filed Oct. 22, 1959 2 Sheets-Sheet 1

INVENTORS
ULYSS S. MITCHELL
RAY F. NEWTON
BY
Lippincott & Ralls
ATTORNEYS

INVENTORS
ULYSS S. MITCHELL
RAY F. NEWTON
BY
Lippincott & Ralls
ATTORNEYS

United States Patent Office 2,971,714

Patented Feb. 14, 1961

2,971,714

MAGNETIC TAPE REEL WITH DIFFERENTIALLY CONNECTED DOUBLE HUB

Ulyss S. Mitchell, 1150 Yew St., San Mateo, Calif., and Ray F. Newton, Menlo Park, Calif.; said Ray F. Newton assignor to Ulyss S. Mitchell Filed Oct. 22, 1959, Ser. No. 848,076

5 Claims. (Cl. 242—55.12)

The present invention relates in general to an improvement in single-reel cartridges for magnetic tape and, more particularly, to the provision of a reel having a pair of differentially connected hub portions, wherein the driven rotation of one of such portions differentially rotates the other hub portion for the desired supply and take-up of magnetic tape thereon.

It is well recognized in the field of magnetic tape recording apparatus that metallic tape or wire adapted to have intelligence impressed thereon by magnetic means must be moved at a constant rate over recording and playback heads to attain suitable fidelity. While it is possible to attain the desired results in this respect with multi-reel devices, difficulty is encountered in magnetic tape recorders employing a single reel for both the supply and take-up of magnetic tape during recording and playback operations. It will be appreciated that a material saving in space may be attained by the elimination of either take-up or supply reel in a magnetic tape recorder, and to this end there have been developed single-reel devices, generally operating with an endless loop of magnetic tape which is normally withdrawn from the center of the reel and rewound upon the outer circumference thereof. It is in connection with this latter type of magnetic tape apparatus that the present invention is directed as an improvement, for the problem of providing a constant tension upon the tape in devices of this type has proven particularly troublesome.

The present invention provides a single reel adapted to operate as both a supply and take-up element for magnetic tape. A desired magnetic tape supply and take-up operation is herein attained by the provision of a double-hub reel. The two hubs hereof are connected through reversible differential drive means of a highly simplified nature, which serves to insure the maintenance of an even tape tension, so that no variations in tape velocity across magnetic recording or playback heads is possible. In this manner, the present invention provides for truly high fidelity magnetic tape recording and playback. While it may be readily recognized that separate hubs of a single magnetic tape reel must be rotated at different angular velocities to provide a constant linear tape velocity when such tape is being withdrawn from one hub and wound upon the other, the provision of suitable differential connections between the hub portions to provide this requisite differential angular velocity thereof poses certain problems and difficulties. Of major importance in this respect, aside from the basic objective of providing the desired magnetic tape motion, is the simplification of differential drive mechanism, as well as the miniaturization thereof. Conventional magnetic tape recording and reproducing apparatus accommodates magnetic tape cartridges of relatively minute size, and the single reel of the present invention is adapted to include between closely spaced hub portions thereof, a very small differential drive mechanism of simplified structure. This simplification of construction affords a low cost reel of substantial economic advantage, and the structure hereof requires no precise tolerances so as to thereby further limit and reduce the expense of manufacture. The reversing feature of the present invention is fully automatic, so that no modification of magnetic tape recording or playback apparatus is necessary for reverse operation of the reel. Additionally, the differential hub connection of the present invention incorporates a minimum of operating elements, of which all are operable in either direction of differential drive, with substantially no variation in the drag or resistance to rotation of the hub resulting from reversing from the relative directions of rotations thereof. Of further advantage hereof is the provision of snap-acting reversing mechanism providing a positive engagement of the differential drive connection upon the reversal of the direction of rotation of the hub portions of the reel.

The present invention, in brief, includes a pair of hubs mounted upon a single axle or shaft affixed to a central plate extending between the hub portions, together with differential drive mechanism also mounted upon said central plate between the hubs and switching means engaging the hubs for reversing the drive mechanism. Such drive mechanism includes a pair of wheels adapted to frictionally engage separate hubs of the reel, and mounted upon a single shaft which is, in turn, pivotally mounted upon the central plate of the reel. A frictional member engages both of the hubs of the reel and is eccentrically linked to the aforementioned shaft for pivoting same. The friction wheels are disposed at different hub radii, so that rotation of one of the hubs will drive the engaging friction wheel to thereby rotate the other friction wheel in frictional engagement with the other hub to consequently rotate such other hub at a different angular velocity, as determined by the difference in radius of the points on the two hubs engaged by the two friction wheels. Variation in the drive ratio is afforded by frictionally engaging elements of the drive mechanism.

It is an object of the present invention to provide an improved reel for magnetic tape apparatus including a pair of hubs interconnected by simplified differential drive mechanism for accommodating the simultaneous winding and unwinding of magnetic tape upon the single reel.

It is another object of the present invention to provide in a single-reel magnetic tape cartridge having a pair of rotatable hubs, an improved differential drive mechanism having a single unit movable between forward and reverse drive directions of the two hubs of the reel.

It is yet another object of the present invention to provide an improved double-hub reel for a magnetic tape cartridge, providing an even tension upon magnetic tape simultaneously wound and unwound thereon.

It is a further object of the present invention to provide for the frictional drive of one hub of a magnetic tape reel from the other hub thereof, to attain a variable differential rotational velocity between hubs of the reel, and to provide for rapid and positive-acting reversal of the frictional drive engagement.

Various other possible objects and advantages of the present invention will become apparent to those skilled in the art, from the following description of the invention, however, no limitation is intended by the terms of such description, and, instead, reference is made to the appended claims for a precise delineation of the true scope of this invention.

The invention is illustrated in the accompanying drawings, wherein.

Figure 1:
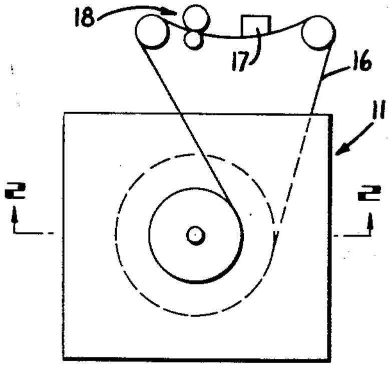
Fig. 1 is a plan view of a magnetic tape cartridge with the magnetic tape traverse schematically illustrated.
Figure 2:
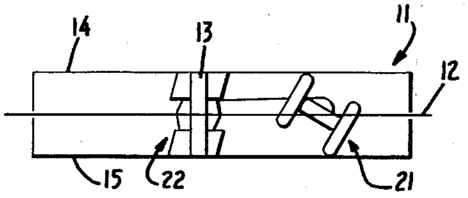
Fig. 2 is a schematic illustration of the cartridge of Fig. 1 taken in the transverse plane 2—2 thereof.

Considering now the present invention in detail, and referring first to Figs. 1 and 2 of the drawings, there is illustrated a magnetic tape cartridge 11 including a central plate 12 having a shaft 13 extending transversely therethrough, and rotatably mounting a pair of oppositely disposed hubs 14 and 15 thereon. Magnetic tape 16 is adapted to be wound upon and about either of the hubs 14 or 15, so as to be withdrawn from one of such hubs and wound upon the other during playback or recording of intelligence upon the magnetic tape. As schematically illustrated in Fig. 1, the magnetic tape may be wound originally about the lower hub 15 and extend in a loop therefrom across a playback, recording, or erasing head 17, and through drive means 18, thence back about the upper hub 14. With the tape secured to the hubs 14 and 15 at opposite ends of such tape, actuation of the drive means 18, which may include a conventional capstan and pinch wheel arrangement, will serve to withdraw tape from the lower hub causing same to rotate. The tape 16 is drawn across the head 17 and about suitable guide or roller means, and back into winding relation about the upper hub 14. Magnetic tape apparatus of this type operates to withdraw tape from a cartridge, or the like, by operating upon the tape itself so that the magnetic tape reels are not directly driven, but instead, the tape is forcibly withdrawn. Material advantage may be attained from this type of tape drive mechanism, however, the rewinding of the tape upon a take-up hub can only be accomplished by driving such hub. In the present invention, there is provided for this purpose a differential drive mechanism 21, including a reversing switch 22, whereby forced rotation of either of the hubs 14 or 15 transmits a driving force to the other hub to rotate same in the opposite direction at a desired rotational velocity.

Figure 3:
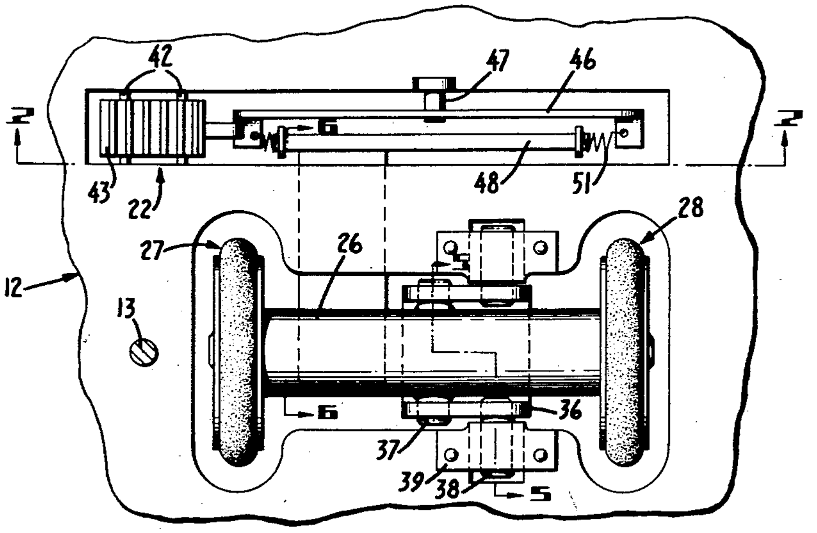
Fig. 3 is a plan view of the differential drive mechanism of the present invention.
Figure 4:
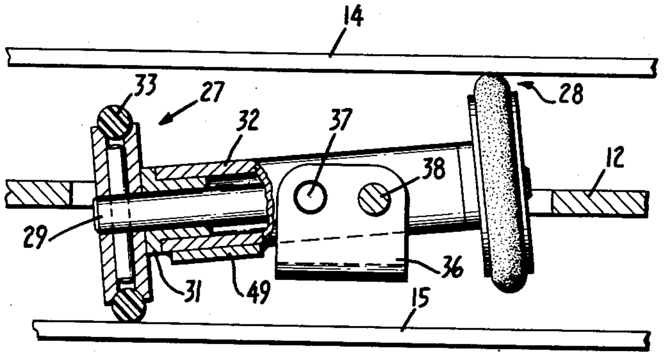
Fig. 4 is an elevational view of the drive mechanism.

Considering the differential drive mechanism of the present invention in greater detail, and referring in this respect to Figs. 3 and 4, there will be seen to be provided a shaft 26 disposed radially of the hubs 14 and 15, and between same. Upon opposite ends of this shaft 26, there are mounted friction wheels 27 and 28. The physical structure of the above-noted elements may include a central axle 29, extending through the wheels 27 and 28 and affixed thereto, with bushings 31 mounting such axle 29 for rotation within an outer cylindrical shell 32 of the shaft 26. Rubber tires, or the like, 33, are disposed about the wheels 27 as in peripheral grooves therein, for frictionally engaging adjacent surfaces of the hubs 14 and 15.

The particular shaft construction noted above is herein employed, inasmuch as the shaft is mounted for pivoting about an axis through the center thereof, and thus the outer shell 32 of the shaft does not rotate, but instead, affords the desired mounting means for the shaft. Pivotal mounting of the shaft 26 is afforded by a U-shaped support 36 extending beneath the shaft, and secured to the shaft at the sides thereof by pins 37. The support 36 is, in turn, pivotally mounted by a pair of stub shafts 38 secured to opposite sides thereof, and rotatably mounted in fixtures 39 secured to the central plate 12.

Control over the pivotal position of the shaft 26 and attached friction wheels 27 and 28 is afforded by the switch means 22, so that the friction wheel 28, which is disposed radially outward of the hub from the friction wheel 27, engages the particular hub being employed to supply magnetic tape, i.e., the hub from which magnetic tape is withdrawn during operation upon the tape. The switching mechanism 22 is in part illustrated in Fig. 7, wherein there will be seen to be provided a pair of links 41 mounted upon shafts 42, secured to the central plate 12. These links are pivotally connected to a pair of feet 43 and 44, with the first of these feet disposed above the links 41 in frictional engagement with the under surface of the upper hub 14, and the other foot 44 disposed beneath the links in frictional engagement with the upper surface of the lower hub 15.

Figure 6:
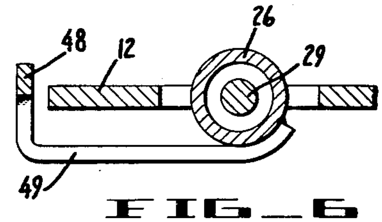
Fig. 6 is a sectional view taken in the plane 6—6 of Fig. 3 and illustrating the connection between the pivotal shaft and the reversing switch lever of the differential drive mechanism.
Figure 5:
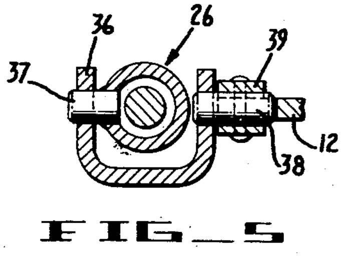
Fig. 5 is a partial sectional view illustrating the pivotal shaft mounting, and taken in the plane 5—5 of Fig. 3.
Figure 7:
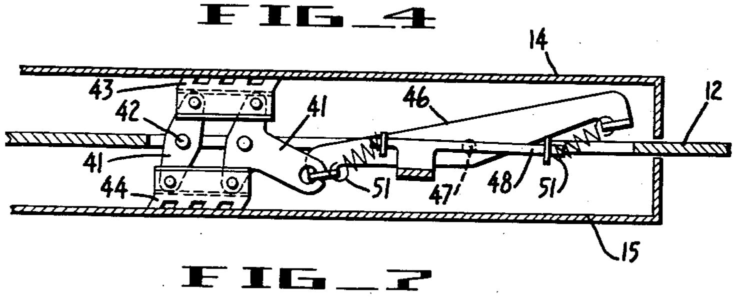
Fig. 7 is an elevational view of the reversing switch mechanism taken in the plane 7—7 of Fig. 3.

The above-described portion of the switching means 22 is oriented within the reel, as indicated in Fig. 3, wherein it will be seen that the shafts 42 are disposed on opposite sides of the wheel shaft 13, with the feet 43 and 44 thereby disposed transversely to the radius of the reel. These feet 43 and 44 of the switching means are formed of a resilient material, such as foam rubber, or the like, and preferably have transverse grooves in the outer surfaces thereof, as best illustrated in Fig. 7, so that clockwise rotation of the upper hub 14 as viewed from the top thereof, will serve to urge the upper foot 43 to the right in Fig. 7 into the position therein illustrated, so as to pivot the links 41 into the position as shown in Fig. 7. These feet frictionally engage the inner surfaces of the hubs with a relatively low coefficient of friction so as to provide a minimum drag upon the hubs during rotation thereof, however, the toothed exterior surfaces of the feet which are deflected or bent over during hub rotation, tend to grip the hub surface at such time as the direction of rotation of same reverses, so that the feet then firmly grasp the hubs and move in the reversed hub rotational direction to pivot the links 41 about the shafts 42 thereof. At least one of the links 41 is provided with an extension which engages a pivot bar 46, mounted as upon a shaft 47, in the plane of the central plate 12. Pivoting of the links 41 thus serves to pivot the bar 46 about the axis 47 thereof, and this axis 47 is disposed perpendicularly to the axis of the shaft 26. Although it is possible to directly pivot the shaft 26 and affixed friction wheels 27 and 28 thereon from the pivot bar 46, a particularly desirable positive action is attained by the utilization of an intermediate arm 48 which is disposed parallel to the shaft 26 at one side thereof and which is rigidly affixed to the shaft as by means of a lateral extension 49, as shown in Fig. 6. This arm 48 is connected to the pivot bar 46 by means of a pair of springs 51 disposed one at each end of the arm and connected to opposite ends of the pivot bar 46. The arm 48 is shorter than the pivot bar 46 and lugs 52 extend transversely from the pivot bar beyond the ends of the arm 48, so that the springs 51 are mounted in compression between these lugs 52 and the ends of the arm 48. One of these lugs 52 may be employed as the connecting means to the link 41 by the provision of a reentrant end configuration of the link extension, so that same fits over the lug, as best illustrated in Fig. 7.

Operation of the switching means 22 to pivot the shaft and friction wheels is accomplished by movement of one of the hubs caused by withdrawing tape therefrom. Thus, for example, if it be assumed that magnetic tape is withdrawn from the lower hub 15, the counterclockwise rotation of this hub, as viewed from the top thereof, will serve to move the lower foot 44 to the left in Fig. 7, whereby the links 41 are pivoted about the shafts 42 thereof so that the link extension is pivoted downwardly, and consequently, the pivot bar 46 is likewise pivoted downwardly at the inner end thereof. In this condition of operation, the arm 48 is pivoted into the position illustrated in Fig. 7, wherein the outer end thereof is depressed below the central plate 12, and consequently, the shaft 26 rigidly joined to this arm 48 by the cross bar 49 is likewise pivoted downwardly at the outer end thereof to frictionally engage the wheel 28 with the upper surface of the lower hub 15 and, at the same time, to frictionally engage the wheel 27 with the under surface of the upper hub 14. A reversal in the direction of rotation of the hubs, as is produced by withdrawing tape from the upper hub 14, causes the upper foot 43 to be moved to the left in Fig. 7 by frictional engagement with the lower hub. This pivots the links 41 to thereby swing the link extension upwardly and, likewise, to pivot the pivot bar 46 into an opposite position from that illustrated in Fig. 7. As the pivot bar 46 is pivoted about the shaft 47 thereof by the engaging link extension, the springs 51 are initially compressed as the pivot bar moves into alinement with the arm 48, and as soon as the pivot bar 46 passes such alinement the springs 51 immediately expand to thereby rapidly pivot the arm 48 so as to swing the outermost portion thereof above the central plate 12. This will be seen to produce a snap action of very positive operation, and inasmuch as the shaft 26 is rigidly affixed to the arm 48 by the cross bar 49, the shaft 26 moves together wtih this arm 48 in a rapid and positive fashion to thereby engage the outer wheel 28 thereof with the upper hub 14 and the inner wheel 27 thereof with the lower hub 15, as illustrated in Fig. 4.

From the foregoing description of operation of the switch means 22, it will be seen that the drive mechanism 21 is always oriented to engage the supply hub with the friction wheel 28, disposed radially outward of the drive mechanism. Consequently, the rotation of the supply hub is transmitted to the take-up hub through the differential drive mechanism to rotate the take-up hub at a greater angular velocity than the supply hub. This drive relationship is highly desirable in that tape is normally withdrawn from the hub having substantially all of the tape wound thereabout, so that tape leaves the supply hub at a greater radius than it is wound upon the take-up hub, and consequently, for a constant linear tape velocity it is necessary for the take-up hub to rotate at a much greater angular velocity than the supply hub. In practice, the amount of tape employed in a magnetic tape cartridge of the type herein envisioned, normally required the take-up hub to be rotated at an angular velocity of about two and one-half times the speed of rotation of the supply hub. It will, of course, be appreciated that as tape is withdrawn from the supply hub and wound upon the take-up hub, the relationship between angular velocities of the two hubs varies through the point at which an equal amount of tape is disposed upon each hub, to a point wherein substantially all of the tape is wound about the take-up hub. Consequently, it is necessary for the drive of the take-up hub to vary in relationship to the rotational velocity of the supply hub, and such is herein accommodated by the frictional engagement of the drive means. Slippage of the drive means is accomplished by the frictional engagement of the rubber tires 33, disposed about the friction wheels 27 and 28. The spring-loaded linkage of the reversing mechanism provides a resilient coupling, so that slippage of the friction wheels against the hubs is readily accommodated by the mechanism.

Figure 8:
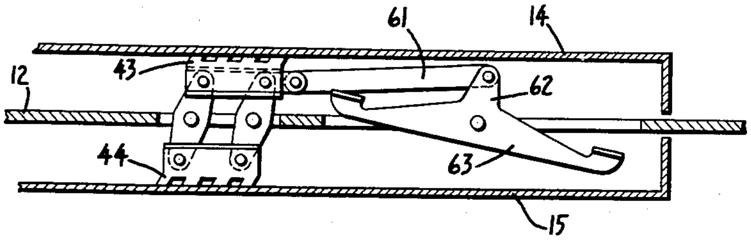
Fig. 8 is an elevational view of an alternative reversing switch eccentric mechanism, and taken in the same plane as Fig. 7.

An alternate switch linkage suitable for use with the variable drive mechanism of the present invention is illustrated in Fig. 8, wherein a link 61 is pivotally connected to the upper foot 43, and also to an upstanding portion 62 of a pivot bar 63. As illustrated in Fig. 8, the pivot bar 63 is provided with laterally extending lugs, or the like, adapted to mount compression springs for engagement with the arm 48 in the same manner as described above. This particular linkage arrangement provides for certain applications a more positive switching action, and affords a mechanical advantage in the pivoting of the pivot bar 63, so as to be admirably suited for particular applications of the present invention.

Figure 9:
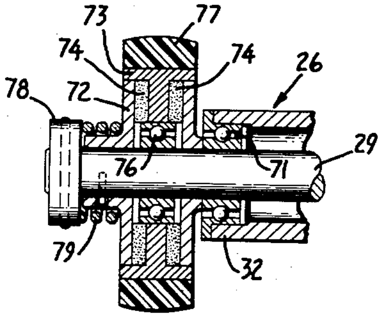
Fig. 9 is a partial sectional view of an alternative construction of the shaft and one friction wheel associated therewith.

As noted above, the friction wheels 27 and 28 of the drive mechanism are adapted to frictionally engage the upper and lower hubs of the magnetic tape reel with such engagement affording a desired degree of slippage, accommodating the requisite variation in rotational drive. It is possible, in accordance herewith, to provide friction clutches to produce the same result, and a modification of a portion of the drive mechanism is illustrated in Fig. 9 wherein such friction clutches are included as a part of the wheel structure. The major portions of the structure illustrated in Fig. 9 are numbered the same as like portions illustrated in Fig. 4. As may be seen by reference to Fig. 9, the shaft 29 extends through the wheel 27, and there may be provided a ball bearing 71 between the axle 29 and shaft cylinder 32. In this instance, the wheel 27 is divided into an inner hub 72 and an outer rim 73, with the inner hub 72 being affixed to the axle 29 for rotation therewith. A friction clutch, or the like 74, is provided between the wheel hub and rim, and such clutch means preferably takes the form of a pair of annular members of felt, or the like, disposed between an inward extension of the rim and mating protuberances upon the hub. A bearing 76 is provided between the axle 29 and the wheel rim 73, so that the latter is free to rotate about the axle. A tire, or coating 77, formed of rubber or the like, is affixed to the wheel hub 73 about the periphery thereof, and is preferably formed with a relatively flat outer surface, as illustrated, to provide a maximum frictional engagement with the reel hubs.

The foregoing assemblage may be maintained upon the shaft by means of a nut, or the like 78, pinned upon the end of the shaft, and compressing a spring 79 between such nut and the wheel hub 72. With this wheel structure, the hub 72 of the wheel is preferably split into two parts so that the spring 79 presses such hub parts together against the friction clutch 74 upon the wheel rim to attain a desired coefficient of friction. It is contemplated that in the instance wherein an internal friction clutch of the type above described is employed, the wheel tire or coating 77 shall substantially follow the hub movement with the desired slippage being afforded by the clutch portion of the structure, so that a desired variation in the relative rates of rotation of the two hubs then occurs by virtue of the slippage at the friction clutch. While it will be noted that this latter-described structure is somewhat more complicated than that set forth above, certain advantages are attained by this more complicated structure, and thus, particular applications of the present invention may dictate the use of one or the other of the alternative structures herein described.

As a brief résumé of the operation of the present invention, it is noted that the insertion of a magnetic tape cartridge 11 within suitable apparatus for recording and playback of information upon magnetic tape carried by the cartridge, is followed by the withdrawing of tape from the supply hub portion of the magnetic tape reel. This is accomplished by such as a capstan and pinch wheel drive means engaging the tape and drawing same across the head 17, as illustrated in Fig. 1. In the instance wherein the magnetic tape is originally wound about the lower hub 15 of the cartridge and extends therefrom in a loop into connection with the upper hub 14, the lower hub 15 may be driven in a counterclockwise direction, as viewed from above. As soon as the tape 16 is pulled from the lower hub 15 by the drive mechanism 18, this lower hub 15 is rotated to thereby move the lower foot 44 to the left, as viewed in Fig. 7, so as to thereby pivot the links 41 into the position also illustrated in Fig. 7. With the pivoting of the switch links 41, the pivot bar 46 is, in turn, pivoted downward at the radially inward end thereof, and the arm 48 is pivoted upwardly at the inner end thereof with a positive snap action through the medium of the springs 51. As the arm 48 is connected by the cross bar 49 to the shaft 26, this shaft will also be pivoted to thereby urge the outer friction wheel 28 into engagement with the lower hub 15 and the inner friction wheel 27 into engagement with the upper hub 14. Owing to the different radii of the hubs engaged by the friction wheels, there will be transmitted a differential driving force to the upper hub 14, from the lower hub 15, through these friction wheels whereby the upper hub is rotated at a greater angular velocity than the lower hub, so as to thereby maintain a constant and even tension upon the magnetic tape withdrawn from the lower hub 15 and fed upon the upper hub 14.

Reversing of the tape drive is accomplished by the magnetic tape apparatus exteriorly of the cartridge, by de-energization of one tape drive means and energization of another tape drive means, preferably disposed on the opposite sides of the playback or recording head 17. Such reversing causes a force to be applied to the magnetic tape 16 so as to withdraw same from the upper hub 14, whereby the upper hub is rotated in a counterclockwise direction. This rotation of the upper hub 14 causes the engaging foot 43 to be moved to the left, as viewed in Fig. 7, and consequently pivots the links 41 to thereby swing the pivot arm 46 about the shaft 47 thereof. As the pivot arm 46 swings about its shaft, the springs 51 are compressed between the end lugs 52 of the pivot arm and the ends of the arm 48, until the pivot arm moves past alinement with the arm 48. At this latter point, the compressed springs 51 expand to rapidly pivot the arm 48 from the position illustrated in Fig. 7, so as to swing the outer end of this arm upwardly above the central plate 12. The connection of the arm 48 through the cross bar 49 to the shaft 26 will thus swing the shaft about the pivotal mounting thereof into the position illustrated in Fig. 4, wherein the outer friction wheel 28 engages the under surfaces of the upper hub 14 and the inner friction wheel 27 engages the inner surface of the lower hub 15. In this position, there will be provided a differential drive between the hubs with force being transmitted from the upper hub through the drive means to the lower hub. In this instance the lower hub 15 will be rotated at a greater angular velocity than the upper hub, owing to the fact that the friction wheel 27 engages the lower hub 15 at a lesser radius thereof than the friction wheel 28 engages the upper hub 14. Variation in the drive ratio between the hubs, as is required during the removal of tape from the upper hub and addition of same to the lower hub, is accommodated herein by slippage at the frictional engagement of the wheels 27 and 28 with the hubs of the reel.

This frictional slippage may be provided for by the structure of Fig. 9, wherein friction clutches are included as an integral portion of the wheel configuration, and in this instance the frictional engagement of the wheel periphery and the inner surface of the contacting hub need not afford slippage. The alternative linking arrangement of Fig. 8 will be seen to be oppositely operable with regard to the linkage of Fig. 7, as same may be required for an alternate magnetic tape traverse. Thus, for example, if the magnetic tape is fed from the opposite side of the hubs it is necessary to reverse the operation of the differential drive mechanism, and same may be accomplished with either of the linkages herein illustrated, so that the illustration of Fig. 8 is merely exemplary of a possible arrangement whereby opposite driving relationship may be attained.

What is claimed is:

1. An improved double-hub reel for magnetic tape, comprising a pair of separate hubs rotatably mounted upon a first shaft through a central plate, a second shaft having a friction wheel affixed to each end thereof and pivotally mounted between said hubs to dispose the wheels at different lengths of hub radii, and switching means frictionally engaging said hubs interiorly thereof and connected to said second shaft for pivoting same to engage the friction wheels with different hubs, depending upon the direction of hub rotation, whereby driving of one hub transmits a differential drive to the other.

2. An improved reversible reel for magnetic tape, comprising a central plate, a pair of oppositely rotatable parallel hubs mounted upon opposite sides of said plate in axial alinement, differential drive means including a pair of connected wheels disposed at different lengths of hub radii and mounted between said hubs to pivot into frictional engagement with separate hubs, and switch means frictionally engaging said hubs and connected to said wheels for pivoting the latter in accordance with the direction of rotation of said hubs.

3. An improved single-reel magnetic tape cartridge, comprising a pair of hubs mounted for rotation upon a first shaft, a second shaft disposed radially of said hubs and between same, means pivotally mounting said second shaft to swing in an arc through a radius of said hubs, an axle rotatably mounted within said second shaft and carrying a friction wheel at opposite ends thereof for frictional engagement with said hubs, whereby rotation of one hub is transmitted to the other with a drive ratio depending upon the points upon said hubs engaged by said wheels, and reversing means including a pair of feet frictionally engaging said hubs interiorly thereof and linked to said second shaft for pivoting same in accordance with the direction of rotation of said hubs, whereby either of said hubs is rotatably driven by rotation of the other hub with the above drive ratio as modified by slippage of the engagement between said friction wheels and hubs.

4. Apparatus as defined in claim 3 further characterized by said switching means including at least one pivotally mounted link connecting the two feet frictionally engaging separate hubs of said reel, a pivot bar linked to said link for pivotal motion in accordance with pivoting of the link in response to movement of said feet as dictated by the direction of rotation of said hubs, and an arm secured to said second shaft and spring-mounted to said pivot arm for snap-action reversing of the pivotal position of said second shaft in response to a reversal of direction of rotation of said hubs.

5. An improvement in magnetic tape reels having a pair of hubs mounted for rotation about a shaft through a plate between the hubs, comprising a pair of friction wheels affixed to a shaft disposed radially of the hubs between same in an opening in said plate, means mounting said latter shaft to pivot about an axis transversely therethrough, whereby each wheel is engageable with each hub, and a friction switch including means frictionally engaging said hubs and an eccentric element connected thereto and to said shaft mounting means for pivoting the latter shaft in accordance with the direction of rotation of the hubs for selectively transmitting drive between said hubs.

No references cited.